US006957993B2

United States Patent
Jiang et al.

(10) Patent No.: US 6,957,993 B2
(45) Date of Patent: Oct. 25, 2005

(54) METHOD OF MANUFACTURING A LIGHT FILAMENT FROM CARBON NANOTUBES

(75) Inventors: KaiLi Jiang, Beijing (CN); ShouShan Fan, Beijing (CN); QunQing Li, Beijing (CN)

(73) Assignees: Tsinghua University, Beijing (CN); Hon Hai Precision Ind. Co., Ltd., Taipei Hsien (TW)

( * ) Notice: Subject to any disclaimer, the term of this patent is extended or adjusted under 35 U.S.C. 154(b) by 208 days.

(21) Appl. No.: 10/334,469

(22) Filed: Dec. 31, 2002

(65) Prior Publication Data

US 2004/0051432 A1 Mar. 18, 2004

(30) Foreign Application Priority Data

Sep. 16, 2002 (CN) ............................................ 02134761

(51) Int. Cl.[7] ................ H01J 9/00; H01J 9/02
(52) U.S. Cl. .............................. 445/50; 445/49; 445/51; 423/447.1; 423/447.3
(58) Field of Search .................... 423/447.1, 447.3; 445/48–51

(56) References Cited

U.S. PATENT DOCUMENTS

| | | | | |
|---|---|---|---|---|
| 6,183,714 B1 | * | 2/2001 | Smalley et al. | 423/447.3 |
| 6,232,706 B1 | * | 5/2001 | Dai et al. | 445/50 |
| 6,440,763 B1 | * | 8/2002 | Hsu | 445/50 |
| 6,628,053 B1 | * | 9/2003 | Den et al. | 445/50 |
| 6,630,772 B1 | * | 10/2003 | Bower et al. | 445/51 |
| 6,682,677 B2 | * | 1/2004 | Lobovsky et al. | 264/172.11 |
| 6,720,728 B2 | * | 4/2004 | Den et al. | 313/310 |
| 6,780,075 B2 | * | 8/2004 | Okamoto et al. | 445/49 |
| 2002/0121856 A1 | * | 9/2002 | Tsai | 313/491 |
| 2004/0053053 A1 | * | 3/2004 | Jiang et al. | 428/408 |
| 2004/0053780 A1 | * | 3/2004 | Jiang et al. | 423/447.1 |

FOREIGN PATENT DOCUMENTS

| | | | | |
|---|---|---|---|---|
| DE | 129029 A | * | 12/1977 | H01K/1/06 |
| JP | 54094783 A | * | 7/1979 | H01K/1/06 |

* cited by examiner

Primary Examiner—Mariceli Santiago
(74) Attorney, Agent, or Firm—Wei Te Chung

(57) ABSTRACT

A light filament (206) formed from carbon nanotubes is characterized by high mechanical strength and durability at elevated temperatures, a high surface area to volume ratio, and high emissivity. Additionally, electrical resistance of the light filament does not increase with increasing temperature as much as electrical resistance of metallic light filaments. Accordingly, power consumption of the light filament is low at incandescent operating temperatures. A method for making a light filament made of carbon nanotubes includes the steps of: forming an array of carbon nanotubes (20); pulling out carbon nanotube yarn (204) from the carbon nanotube array; and winding the yarn between two leads (30) functioning as electrodes to form the light filament.

21 Claims, 2 Drawing Sheets

METHOD OF MANUFACTURING A LIGHT FILAMENT FROM CARBON NANOTUBES

BACKGROUND OF THE INVENTION

1. Field of the Invention

This invention generally relates to a light filament and a method for making the same, and more particularly to a light filament and a method for making the same formed of carbon nanotubes. The instant application relates to the copending applications Ser. Nos. 10/334,547 filed Dec. 31, 2002 and 10/335,283 filed on Dec. 31, 2002.

2. Description of the Related Art

Electric light filaments are typically made of materials which are either polycrystalline in nature or which are amorphous, or noncrystalline, in nature. Such materials become brittle when they are subjected to high temperatures for prolonged periods.

Polycrystalline materials, which include the majority of commercially available metallic filaments, are characterized by the presence of crystal grain boundaries, dislocations, voids and various other microstructural imperfections. These microstructural imperfections lead to grain growth and recrystallization, particularly at elevated temperatures, which in turn lead to increased brittleness and diminished strength.

Metallic filaments have relatively low electrical resistivity. Therefore, they are often made quite long and are tightly coiled in order to fit within a light bulb of suitable size. Coiling of a filament reduces its effective radiating surface area because parts of the coiled filaments partially block other parts, thereby diminishing the radiative efficiency of the filament. This results in a coiled filament's higher electrical power consumption to produce the same amount of radiating surface area. A light filament having a higher surface area to volume ratio can provide greater radiative efficiency.

Hence, an improved light filament that overcomes the aforementioned problems is desired.

SUMMARY OF THE INVENTION

Accordingly, an object of the present invention is to provide a light filament having a high surface area to volume ratio and great durability, particularly at elevated temperatures.

Another object of the present invention is to provide a method for making a light filament having a high surface area to volume ratio and great durability, particularly at elevated temperatures.

In order to achieve the first above-mentioned object, a light filament in accordance with the present invention is formed from carbon nanotubes. The light filament is characterized by high mechanical strength and durability at elevated temperatures required to achieve incandescence. In addition, the light filament is characterized by a high surface area to volume ratio and high emissivity compared with conventional metallic light filaments. Additionally, electrical resistance of the light filament does not increase with increasing temperature as much as electrical resistance of metallic light filaments. Accordingly, power consumption of the light filament is low at incandescent operating temperatures.

In order to achieve the second above-mentioned object, a method for making a light filament in accordance with the present invention comprises the steps of: forming an array of carbon nanotubes; pulling out carbon nanotube yarn from the carbon nanotube array; and winding the yarn between two leads to form the light filament.

Other objects, features and advantages of the present invention will become apparent from the following detailed description when read in conjunction with the accompanying drawings in which:

DETAILED DESCRIPTION OF THE PREFERRED EMBODIMENT

Figure 1:
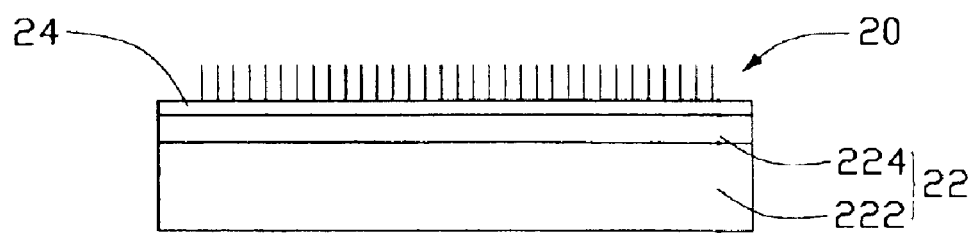
FIG. 1 is a schematic side elevation view of an array of carbon nanotubes formed by a method in accordance with the present invention.

The present invention is further described below with reference to the drawings, in which like reference numerals are used to designate identical or corresponding parts.

Figure 3:
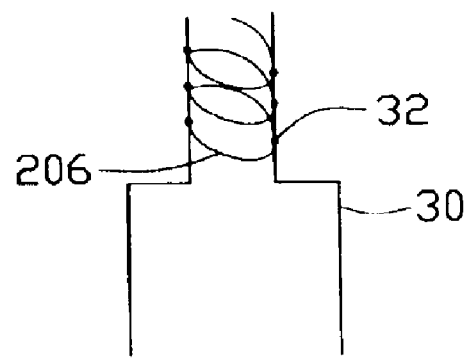
FIG. 3 is a schematic side view of a light filament formed by winding the carbon nanotube yarn of FIG. 2 between two tungsten leads, in accordance with the present invention.

Referring now to FIG. 3, the present invention provides a light filament 206 comprising carbon nanotubes. The light filament 206 is characterized by high mechanical strength and durability at the elevated temperatures required to achieve incandescence. In addition, the light filament 206, when wound on two tungsten leads 30, is characterized by a high surface area to volume ratio and high emissivity compared with conventional metallic light filaments. Additionally, electrical resistance of the light filament 206 does not increase with increasing temperature as much as electrical resistance of tungsten light filaments. Accordingly, power consumption of the light filament 206 is low at incandescent operating temperatures.

A method for making the light filament 206 comprises:

Step 1. Referring to FIG. 1, forming a superaligned array of carbon nanotubes, discussed in greater detail below.

Firstly, a substrate 22 is provided. The substrate 22 includes a silicon wafer 222, which is two inches in diameter and 350 $\mu$m thick. An 800 nm thick thermal-oxidized layer 224 is deposited on the silicon wafer 222. A surface of the thermal-oxidized layer 224 is flat and smooth, to enable growth of a large-scale array of carbon nanotubes. Then an iron thin film 24 that is 5 nm thick is deposited on the substrate 22 by electron beam evaporation, and is subsequently annealed in air at 300~400° C. for 10 hours to form a ferrous oxide film. Then the ferrous oxide film is reduced to pure iron by reaction with hydrogen or ammonia, so that the pure iron can be used as a catalyst.

The substrate 22 is then preferably diced into a plurality of rectangular pieces. Each such piece is put into a quartz boat, which is subsequently inserted into the center of a one-inch quartz tube furnace. The tube furnace is then heated to 650~700° C. in flowing argon gas. After that, a mixture of 30 sccm (standard cubic centimeter per minute) acetylene and 300 sccm argon gas is introduced into the tube furnace for 5~30 minutes. Acetylene functions as a carbon source gas, and argon functions as a protecting gas. The furnace is then cooled down to room temperature. Thus, a superaligned carbon nanotube array 20 is formed on the substrate 22.

Figure 2:
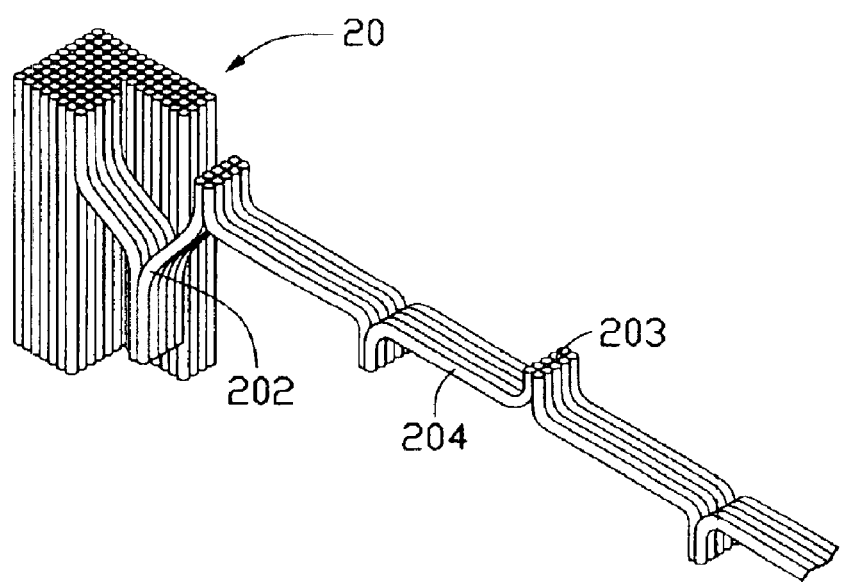
FIG. 2 is a schematic isometric view of a procedure for forming carbon nanotube yarn from the array of carbon nanotubes of FIG. 1, in accordance with the present invention.

Step 2. Referring to FIG. 2, pulling out carbon nanotube yarn 204 from the carbon nanotube array 20.

Carbon nanotube bundles 202 of the carbon nanotube array 20 are pulled out by a tool, for example, tweezers. A carbon nanotube bundle 202 is any group of carbon nanotubes formed in a contiguously adjacent group in the carbon nanotube array 20. As a carbon nanotube bundle 202 is drawn out, it pulls out other carbon nanotube bundles 202 joined end to end at joint portions 203 thereof by van der Waals attraction therebetween. As a result, the yarn 204 is formed.

Step 3. Referring to FIG. 3, winding the yarn 204 between two leads functioning as electrodes to form the light filament 206.

Since the yarn 204 is easily broken by strong or uneven forces, the yarn 204 is wound carefully between two tungsten leads 30 which are spaced apart by approximately 1 cm. Silver paste 32 is applied on the tungsten leads 30 at positions where the tungsten leads 30 join with the yarn 204, to lower resistance between the yarn 204 and the tungsten leads 30. Thus the light filament 206 is formed, which can emit incandescent light when a DC voltage is applied across the tungsten leads 30.

Based on extensive experimentation on the growth mechanisms of carbon nanotubes, the crucial factors for growing a superaligned carbon nanotube array 20 are listed below:
  a. The substrate 22 should be substantially flat and smooth.
  b. The growth rate should be relatively high.
  c. The partial pressure of carbon source gas should be relatively low.

When the substrate 22 is flat and smooth, a higher density carbon nanotube array 20 can be formed. Because the carbon nanotubes are packed closely together, van der Waals attraction between adjacent carbon nanotubes is strong, which enables the carbon nanotubes to be pulled out from the carbon nanotube array 20 to form the yarn 204. Therefore, non-porous silicon wafer or silicon wafer with a thermal-oxidized film can be used as the substrate 22.

If factors b and c above are fulfilled, the carbon nanotubes will be well graphitized, and will have no deposits on their outer surfaces. As is known in the art, during the growth of carbon nanotubes, amorphous carbons are simultaneously deposited on outer surfaces of the carbon nanotubes. This gives rise to considerably less van der Waals attraction between the carbon nanotubes. The growth rate of the carbon nanotubes needs to be high, while the deposition rate of amorphous carbons needs to be low. The growth rate of carbon nanotubes is proportional to the difference between the furnace temperature and the local temperature of the catalyst. Generally, the difference in the temperatures is controlled to be at least 50° C., in order to enhance the growth rate of the carbon nanotubes. The deposition rate of amorphous carbons is proportional to the partial pressure of carbon source gas. In practice, the local temperature of the catalyst can be controlled by adjusting the flow rate of carbon source gas, and the furnace temperature can be directly controlled. The partial pressure of carbon source gas can be controlled by adjusting the ratio of the flow rates of the carbon source gas and the protecting gas. Typically, the partial pressure of carbon source gas is controlled to be not more than 0.2, and preferably not more than 0.1.

A combined width of the yarn 204 depends on a number of carbon nanotube threads in the yarn 204. In general, the combined width of the yarn 204 can be controlled by a size of the tips of the tool that is used to pull out the yarn 204. The smaller the tips, the thinner the combined width of the yarn 204. A force required to pull out the yarn 204 together depends on the combined width of the yarn 204. Generally, the greater the combined width of the yarn 204, the greater the force required. A combined length of the yarn 204 depends on an area of the carbon nanotube array 20.

In alternative embodiments of the preferred method, when forming the carbon nanotube array 20, other gases such as nitrogen or helium can be used as the protecting gas instead of argon gas. Other metals, such as cobalt or nickel, can be used as the catalyst instead of iron. Other carbon hydrogen compounds, such as methane or ethylene, can be used as the carbon source gas.

Preferably, the formed light filament 206 is further treated as follows. The light filament 206 mounted on the leads 30 is put into a vacuum system, which is evacuated to $5 \times 10^{-3}$ Pa (Pascals). Then a DC voltage is applied to the light filament 206 across the tungsten leads 30 for a fixed period of time so that the light filament 206 emits incandescent light. After such so-called heat treatment, the light filament 206 is stronger and more elastic. In addition, it has been found that when higher DC voltages are used for the heat treatment, electrical current in the light filament 206 increases proportionately. It has also been found that the tensile strength and the conductivity of the light filament 206 can be considerably enhanced by such heat treatment.

In particular, a new light filament 206' (not illustrated) having new properties can be formed essentially by performing such a heat treatment on the light filament 206. A different new light filament 206" (not illustrated) having different properties can be formed by performing a similar heat treatment on the light filament 206, but using different parameters of time and voltage applied. By plotting the I–V (current-voltage) curve and measuring the tensile strength of each of the light filaments 206, 206' and 206", changes produced in the light filament 206 by the two different regimes of heat treatment can be investigated.

For instance, when a fixed DC voltage of 50V was applied to one light filament 206 for 3 hours, and the light filament 206 was then allowed to cool down, it became the light filament 206'. When a fixed DC voltage of 70V was applied to another identical light filament 206 for 3 hours, and said another light filament was then allowed to cool down, said another identical light filament 206 became the light filament 206".

Figure 4:
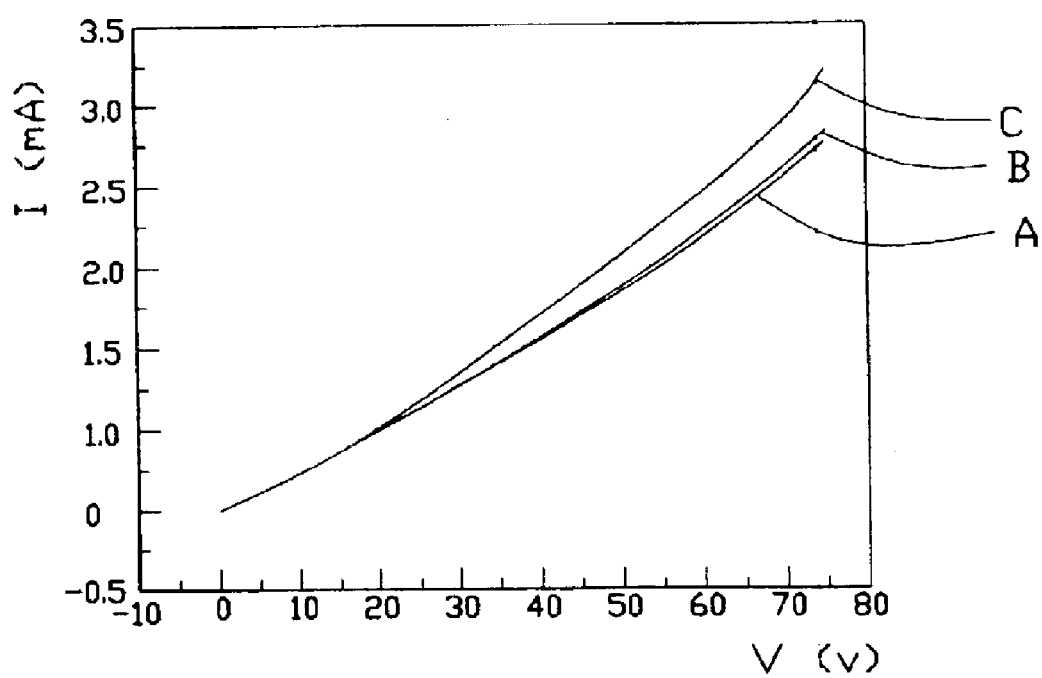
FIG. 4 is a current (I) versus voltage (V) graph, showing empirical I–V curves obtained for a light filament made by the method of the present invention before and after heat treatment.

Referring to FIG. 4, the I–V curves of the light filaments 206, 206' and 206" in vacuum are recorded by using Keithley 237, respectively yielding curves A, B and C. As seen, there is no substantial difference between curves A and B. However, when comparing curves A and C, a significant increase in current is attained, especially at higher operating voltages. In particular, at the operating voltage 70V, the current of curve C is about 13% higher than that of curve A. That is, the light filament 206" carries about 13% more current than the light filament 206 at this operating voltage.

Tensile breaking strength tests have been conducted on the light filaments 206 and 206". Tensile breaking strength obtained by strain gauge measurement on the light filament 206 and 206" is 1 mN and 6.4 mN respectively. That is, the tensile breaking strength of the light filament 206 is enhanced more than six-fold after heat treatment for 3 hours at 70V to form the light filament 206".

The enhanced conductivity and tensile strength of the light filament 206" indicates that some structural change has occurred in the light filament 206 as a result of said heat treatment. During heat treatment of the light filament 206, the joint portions 203 of the yarn 204 provide the highest electrical resistivity in the light filament 206. Accordingly, these joint portions 203 sustain the highest increases in temperature, and the structure of the light filament 206 at these joint portions 203 may be changed significantly.

It will be understood that the particular devices embodying the present invention are shown and described by way of illustration only, and not as limiting the invention. The principles and features of the present invention may be employed in various and numerous embodiments thereof without departing from the scope of the invention.

What is claimed is:

1. A method for making a light filament, comprising:
   forming an array of carbon nanotubes having a density sufficient to pull out carbon nanotube yarn therefrom;
   pulling out carbon nanotube yarn from the carbon nanotube array; and
   winding the yarn between two leads functioning as electrodes to form the light filament.

2. The method as claimed in claim 1, wherein the step of forming an array of carbon nanotubes comprises:
   providing a substrate having a flat, smooth surface;
   depositing a catalyst film on the substrate;
   putting the substrate having the catalyst film thereon into a furnace;
   introducing protecting gas while heating the furnace up to 650~700° C.;
   introducing a mixture of carbon source gas and protecting gas at respective fixed flow rates for 5~30 minutes; and
   cooling the furnace down to room temperature, whereby an array of carbon nanotubes is formed on the substrate.

3. The method as claimed in claim 2, wherein the substrate includes a non-porous silicon wafer having a flat and smooth surface.

4. The method as claimed in claim 2, wherein the substrate includes a silicon wafer and a thermal-oxidized layer having a flat and smooth surface deposited on the silicon wafer.

5. The method as claimed in claim 2, wherein the catalyst film is an iron, cobalt or nickel film.

6. The method as claimed in claim 5, wherein the iron film is deposited on the substrate, and is then annealed in air at 300~400° C. for 10 hours to form a ferrous oxide film, and subsequently the ferrous oxide film is reduced to pure iron by reducing gas.

7. The method as claimed in claim 6, wherein the reducing gas is hydrogen or ammonia.

8. The method as claimed in claim 2, wherein the protecting gas is argon, helium or nitrogen.

9. The method as claimed in claim 2, wherein the carbon source gas is acetylene, methane or ethylene.

10. The method as claimed in claim 2, wherein the carbon source gas is acetylene, and the protecting gas is argon.

11. The method as claimed in claim 2, wherein a ratio of the flow rates of carbon source gas and protecting gas is not more than 0.2.

12. The method as claimed in claim 2, wherein a ratio of the flow rates of carbon source gas and protecting gas is not more than 0.1.

13. The method as claimed in claim 1, wherein the step of pulling out carbon nanotube yarn from the carbon nanotube array comprises the step of:
    pulling out carbon nanotube bundles from the carbon nanotube array.

14. The method as claimed in claim 1, wherein the leads are tungsten leads.

15. The method as claimed in claim 1, further comprising the step of:
    applying silver paste on the leads at positions where the leads join with the yarn, to lower resistance between the yarn and the leads.

16. The method as claimed in claim 1, further comprising the steps of:
    putting the light filament into a vacuum system;
    evacuating the vacuum system to at least $5 \times 10^{-3}$ Pa; and
    applying a DC voltage to the light filament across the leads for at least 3 hours.

17. The method as claimed in claim 16, further comprising the step of:
    cooling down the light filament.

18. The method as claimed in claim 16, wherein the DC voltage is 70V.

19. The method as claimed in claim 1, wherein the carbon nanotube yarn comprising a plurality of carbon nanotube bundles which are joined end to end by van der Waals attractive force.

20. A method for making a light filament, comprising:
    forming an array of carbon nanotubes;
    pulling out carbon nanotube yarn from the carbon nanotube array;
    winding the yarn between two leads functioning as electrodes to form the light filament, and applying silver paste on the leads at positions where the leads join with the yarn, to lower resistance between the yarn and the leads.

21. A method for making a light filament, comprising:
    forming an array of carbon nanotubes;
    pulling Out carbon nanotube yarn from the carbon nanotube array;
    winding the yarn between two leads functioning as electrodes to form the light filament;
    putting the light filament into a vacuum system;
    evacuating the vacuum system to at least $5 \times 10^{-3}$ Pa; and
    applying a DC voltage to the light filament across the leads for at least 3 hours.

* * * * *